Figure 1:
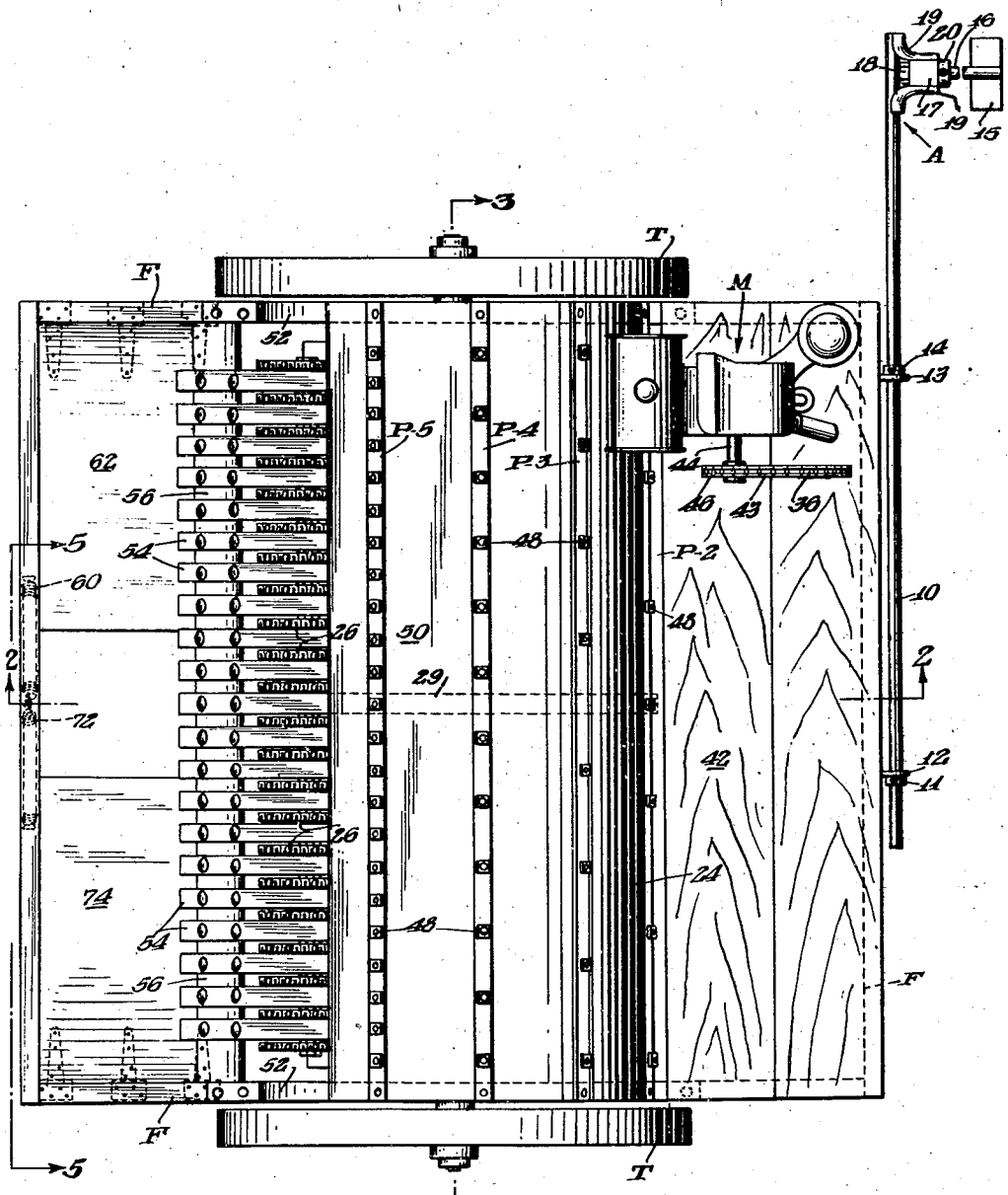

May 2, 1944. F. S. CHILTON 2,348,183
FODDER TREATING METHOD
Original Filed Aug. 4, 1942 4 Sheets-Sheet 1

INVENTOR.
Forrest S. Chilton

May 2, 1944.   F. S. CHILTON   2,348,183
FODDER TREATING METHOD
Original Filed Aug. 4, 1942    4 Sheets-Sheet 3

INVENTOR.
Forrest S. Chilton

May 2, 1944.    F. S. CHILTON    2,348,183
FODDER TREATING METHOD
Original Filed Aug. 4, 1942    4 Sheets-Sheet 4

INVENTOR
Forrest S. Chilton

Patented May 2, 1944

2,348,183

UNITED STATES PATENT OFFICE 2,348,183

FODDER TREATING METHOD

Forrest S. Chilton, Pompton Plains, N. J.

Original application August 4, 1942, Serial No. 453,547. Divided and this application January 18, 1943, Serial No. 472,728

2 Claims. (Cl. 99—8)

This invention concerns fodder treating methods. It is a division of application No. 453,547 filed August 4, 1942.

Substantially all the vitamins and enzymes in fodder plants are in the sap contained in the capillaries leading from the roots to and permeating the leaves. By weight, about 40% of the sap is water soluble food material. The leaves contain about 70% of the nutrient value of the plants and the major part of the chlorophyl and carotene ingredients from which the consuming animals organize vitamin A.

All fodder curing methods include the steps of topping the plants and subjecting the toppings to sun and atmospheric action in the field or to the action of hot gases in kilns. In both systems the curing time of stems far exceeds that of the leaves.

Any step in field curing which accelerates stem curing lessens injury from intervening rains, dews and fogs, from deleterious chemical action, from over-drying, shattering and loss of leaves and from loss in and injury to the food, vitamin, enzyme, chlorophyl and carotene ingredients.

The state of the art reveals that stem curing can be and has been accelerated by comminuting the plants, by slicing them and by crushing them to the extent of cracking the stem walls, rupturing the capillary walls internally and squeezing the sap and much of the chlorophyl and carotene ingredients out of the stems, stemlets and leaves.

Applicant discovered that, if a substantial number of capillaries adjacent to the integuments were externally multi-tapped (many times tapped) following the conventional topping step, the water content of the sap in the tapped capillaries would, in vapor form, rapidly vent through the taps, the water content of the sap in the non-tapped capillaries would osmose through the inner capillary walls into the tapped capillaries as fast as the water content therein becomes depleted, the food, vitamin and enzyme elements in the sap and the chlorophyl and carotene ingredients would be left internally positioned and practically immune from danger of being washed away by intervening rains or falling to the ground or being injured by air oxygen and/or by unobstructed sun rays, and the stem curing would be materially accelerated.

Applicant also discovered that such tapping could be accomplished by striating the stems and that the extent of tapping resulting from wavy criss-crossing striae would reduce the stem curing time to approximately that of the leaves.

Applicant then discovered that the stems could be effectively striated by pulling them through spaces between pins, that it was more effective if they were pulled therethrough by fingers similar to the pins, that fingers and pins bearing V-shaped threads were very effective and caused striae of the nature of shallow cuts, that fingers and pins bearing notches or pegs tended to rip and impair the integrality of the plants as well as striate the stems and that round or angular pins and fingers were least effective and tended to give striae of an abrasive nature.

Applicant further discovered that wavy criss-crossing striae could be obtained, without materially comminuting, slicing or crushing the plants by arranging the pins in successive rows, separating them laterally by spaces of progressively decreasing length and causing rows of fingers to travel in progressively diminishing numbers through the successive lateral spaces between the pins in the order of their decreasing lengths, provided there were substantial clearances between the pins and fingers.

The preferred embodiment of the striating combination above described is illustrated in the accompanying drawings made a part hereof.

Figure 2:
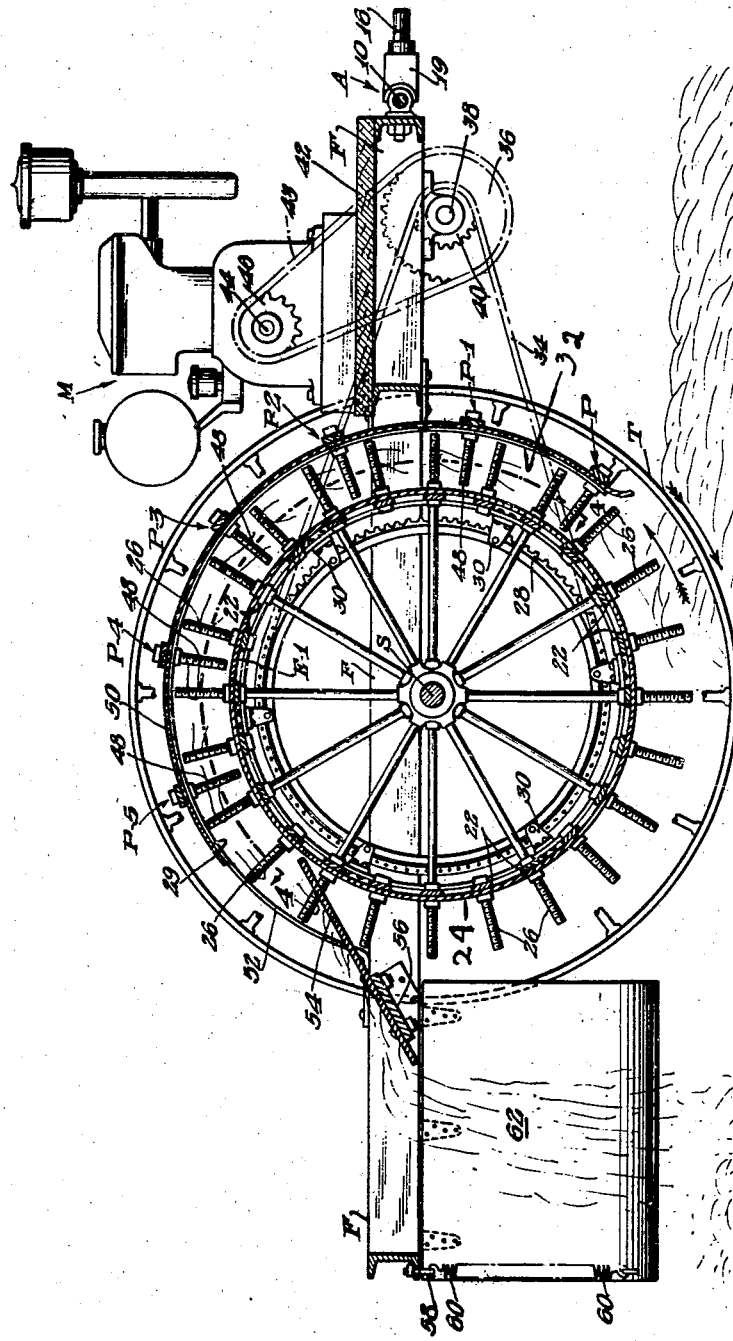
Figure 3:
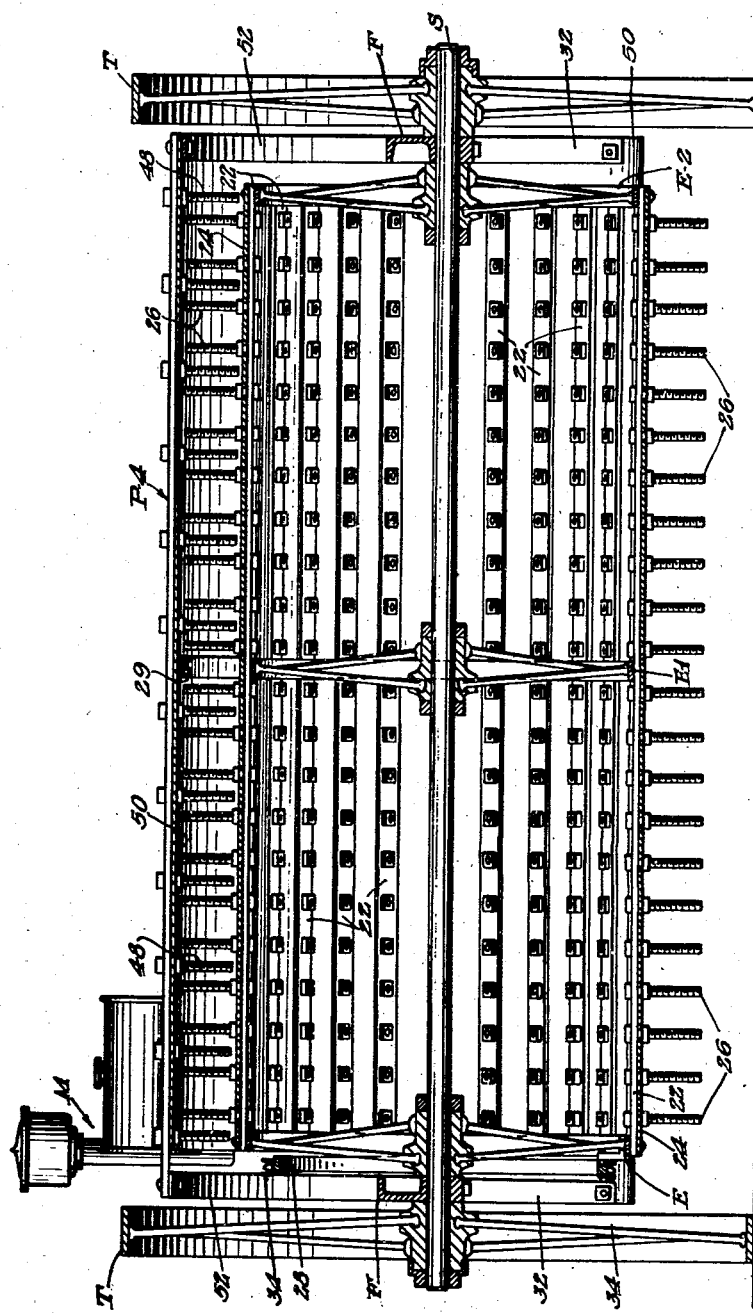
Figure 4:
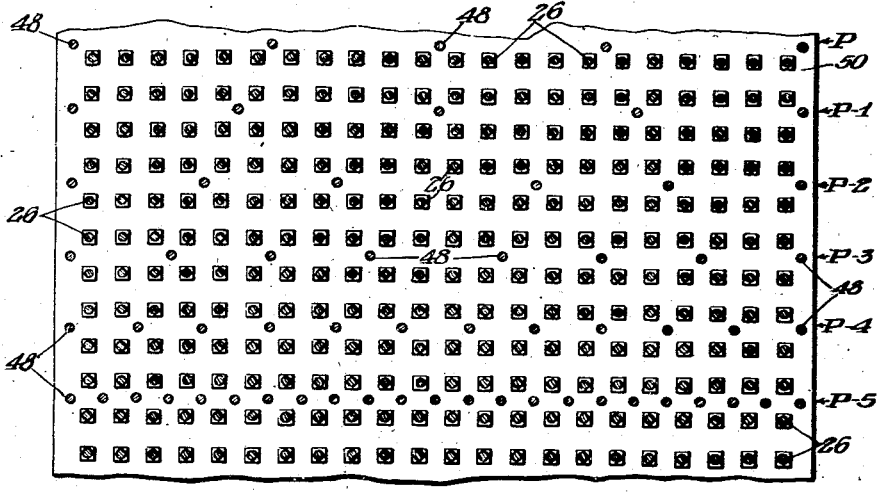
Figure 5:
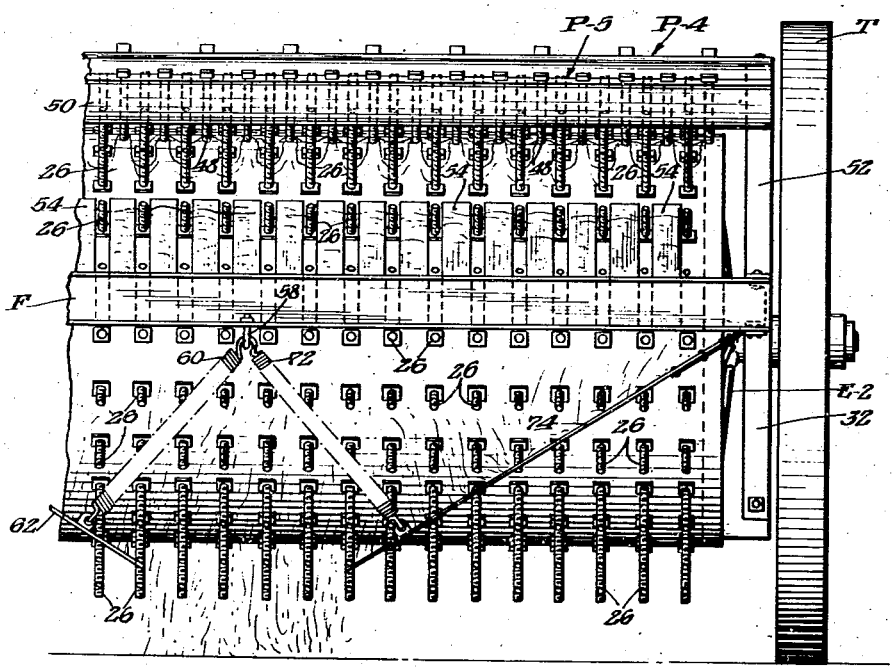

Fig. 1 is a top plan view. Fig. 2 is a sectional view on line 2—2 of Fig. 1. Fig. 3 is a sectional view on line 3—3 of Fig. 1. Fig. 4 is a sectional view in development form on line 4—4 of Fig. 2. Fig. 5 is a rear view.

*Wheels.*—Traction wheels T are loose mounted on the ends of axle shaft S. Rectangular frame F of channel iron is rigidly clamped to axle S inside the hubs of wheels T. Drum wheels E, E—1 and E—2 are loose mounted on shaft S, E being close to the left side of frame F, E—2 being close to the right side and E—1 midway between them.

*Fingers.*—Twenty-four finger bars 22 are positioned parallel to axle S and welded to the rims of said drum wheels. Drum band 24 encircles the finger bars and completes a drum.

Fingers 26 are radially mounted in circumferentially aligned rows through holes punched in said finger bars and said band. There is a clearance between the tips of fingers 26 and the ground line, e. g., spaces equal to the height of the stubble.

*Pins.*—Curved pin bar supports 52 are bolted at both ends to the upper flanges on the right and left sides of the frame F. Segments 32 of similar supports are positioned under right and left sides. The upper ends of supports 32 are bolted to the lower flanges of the side pieces of the frame and the lower ends thereof are positioned above the ground line on the front end of the apparatus. The radii of 32 and 52 from S slightly exceeds the radius of from S to the tips of fingers 26.

*Pins.*—Pin bars P, P—1, P—2, P—3, P—4 and P—5 are positioned parallel to axle S and bolted to supports 32 and 52. P is positioned near the terminals of supports 32. P—5 is positioned above the rear terminals of supports 52. The others are spaced equi-distantly between P and P—5.

Hood 50 is positioned over supports 32 and 52 and under said pin bars. Brace 29 is bolted to the centers of said pin bars. Pins 48 are positioned in holes punched through said hood and pin bars at points corresponding to the centers between the circumferentially aligned rows of fingers 26. Said pins are separated laterally by spaces which progressively decrease in length commencing at the bar P. Fingers 26 travel through said spaces in the order of their diminishing lengths. There are substantial lateral clearances between the pins and fingers, e. g., ½".

Fig. 4 in development form along line 4—4 on Fig. 2 illustrates a suitable arrangement of pins in relation to fingers. 26 indicates fingers and 48 indicates pins.

*Comb.*—It will be noted that the finger drum rotates clockwise and the traction wheels rotates anticlockwise. Fingers 26 pick up the toppings and pull them through the spaces between pins 48 from P to P—5. Below P—5 a comb is positioned comprising teeth 54 bolted to support 56 and extending diagonally upwardly between and nearly filling the spaces between the circumferentially aligned rows of fingers 26.

*Windrower.*—A windrowing assembly is positioned below the comb. It comprises wings 62 and 74 hinged to the sides of frame F and extension springs 60 and 72 anchored respectively to 62 and 74 and to eye-bolt 58 at the center of the rear of frame F. The wings are held separated and above the ground line. The extension springs greatly augment the vibrations of the wings incidental to traction movements and thereby assist in keeping the wings clear. Of course the windrower may be omitted. The same is true of the comb.

*Power.*—Platform 42 is positioned over the fore part of frame F. A gasoline motor M of the automatic clutch type is positioned on said platform. Chain 43 is trained over sprocket 46 on motor output shaft 44 and over sprocket 36 on jackshaft 38. There is a soft pin in the connector of chain 43.

Chain 34 is trained over sprocket 40 on jackshaft 38 and over sprocket ring 28 which is fastened to drum wheel E by means of six castings 30 bolted to the rim thereof and to said ring.

The power system above described is only one of the many suitable for minimizing the required traction power and rotating the drum with sufficient velocity to prevent clogging and to limit the load carried by each finger. A velocity of about twelve horizontal rows of drum fingers to each traction foot gives a good result generally. Of course the traction power may be used for rotating the drum.

*Traction.*—Thills or tongues may be attached to the front of the apparatus for using horses or tractors for traction power. However in the design shown the required traction power is so slight that it would seem advisable to have the striator trail the cutter bar of mowing machines and thereby accomplish topping, striating and windrowing in one operation.

Shaft 10 of trailing assembly A (see Fig. 1) is positioned through eyebolts 12 and 13 in the front end of frame F. Shaft 10 extends beyond the left side of the striator to an extent variable by shifting collars 11 and 14. Near the terminal of shaft 10 block 17 is positioned. Arms 19 are welded to block 17 and shaft 10. Swivel shaft 16 is positioned in a hole drilled in block 17 and is held in position by nut 18 and collar 20. Plate 15 serves as an anchor for brackets clamped to the body of the mowing machine. The brackets must differ with the type of mower.

The striating step leaves the plants in a condition of uniform density whether windrowed or respread on the ground. In windrows there also comes into play the law that contacting bodies tend to equalize their heat and moisture content.

The striating step also removes much of the difficulty of mastication due to the toughness of dried integuments.

It is understood that the process improvements above described are not to be deemed limited to any particular way of striating or external tapping and that the combinations of fingers and converging pins is not to be deemed limited to any particular embodiment, nor to any particular types of or material for pins or fingers.

However, it is essential that the stationary projecting members (pins) be positioned in successive rows and separated laterally by spaces of progressively decreasing lengths, that the rows of moving projecting members (fingers) travel in progressively diminishing numbers through the successive spaces between the pins in the order of decreasing lengths and that there be substantial clearances between the fingers and the pins. It is the successive sliding over and off pins and fingers by the wiggling and twisting stems that produces the wavy criss-crossing striation essential to adequate tapping and that, in cooperation with the clearances, between pins and fingers prevent material comminution, slicing or crushing. The coaction of the projecting members is so dependent on their relation to each other that any alteration thereof would destroy the cooperation between them essential to the attainment of adequate striation, and especially to the attainment of adequate striation without materially comminuting, slicing, or crushing the plants.

I claim:

1. In fodder treating methods characterized by topping the plants and subjecting the toppings to sun and atmospheric action, the new and useful improvement consisting in following the topping step by a step comprising striating the stems and by omitting crushing steps, whereby a substantial number of capillaries adjacent to the integuments are multi-tapped, the escape of vaporized water in the sap is facilitated, the curing is accelerated, the food, vitamin and enzyme content of the sap is left internally positioned, the integrity of the plants and the internal cellular structure thereof is substantially preserved and the difficulty of mastication is lessened.

2. In fodder treating methods characterized by topping the plants and subjecting the topping to the action of hot gases, the new and useful improvement consisting in following the topping step by a step comprising striating the stems and by omitting crushing steps, whereby a substantial number of capillaries adjacent to the integuments are multi-tapped, the escape of vaporized water in the sap is facilitated, the curing accelerated, the food, vitamin and enzyme content of the sap is left internally positioned, the integrity of the cellular structure of the plants is substantially preserved and the difficulty of mastication is lessened.

FORREST S. CHILTON.